(12) United States Patent
Parkhill

(10) Patent No.: US 7,991,882 B1
(45) Date of Patent: Aug. 2, 2011

(54) COMMUNICATIONS NETWORK WITH FLOW CONTROL

(75) Inventor: Robert P. Parkhill, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 407 days.

(21) Appl. No.: 12/137,687

(22) Filed: Jun. 12, 2008

(51) Int. Cl.
*G06F 15/173* (2006.01)

(52) U.S. Cl. ........ 709/224; 709/220; 709/228; 709/238; 370/392

(58) Field of Classification Search .................. 709/220, 709/224, 228, 238; 370/392
See application file for complete search history.

(56) References Cited

U.S. PATENT DOCUMENTS

| | | | |
|---|---|---|---|
| 6,356,929 B1 * | 3/2002 | Gall et al. | 709/201 |
| 7,092,395 B2 * | 8/2006 | He et al. | 370/395.2 |
| 7,542,471 B2 * | 6/2009 | Samuels et al. | 370/392 |
| 7,656,799 B2 * | 2/2010 | Samuels et al. | 370/231 |
| 2005/0005024 A1 * | 1/2005 | Samuels et al. | 709/238 |
| 2007/0058651 A1 * | 3/2007 | Bowen et al. | 370/412 |

OTHER PUBLICATIONS

*Military Embedded Systems*, Packet processors to speed and protect military networks, Nov./Dec. 2009, 2 pages (cover page and p. 8).
*Embedded Computing Design*, Telum NPA-58×4; http://embedded-computing.com/telum-npa-58×4, Jan. 15, 2010, 2 pages.
Co-pending U.S. Appl. No. 12/109,867, filed Apr. 25, 2008.

* cited by examiner

*Primary Examiner* — Khanh Q Dinh
(74) *Attorney, Agent, or Firm* — Hamre, Schumann, Mueller & Larson, P.C.

(57) ABSTRACT

Systems and methods for implementing flow control in communication networks to maximize data transmission of, and prevent loss of data by, the communication networks. Data flow status is designed to reach each network device where the decision to prioritize and buffer data is made. Where there are devices that do not provide flow control, flow control is provided on their behalf. For example, where a satellite modem does not provide flow control, a flow control device is provided in front of the modem. The flow control device knows the data transfer characteristics of the modem, for example by receiving data transfer status information from the modem or by modem characteristic information loaded into the flow control device, and creates flow control on its behalf.

17 Claims, 4 Drawing Sheets

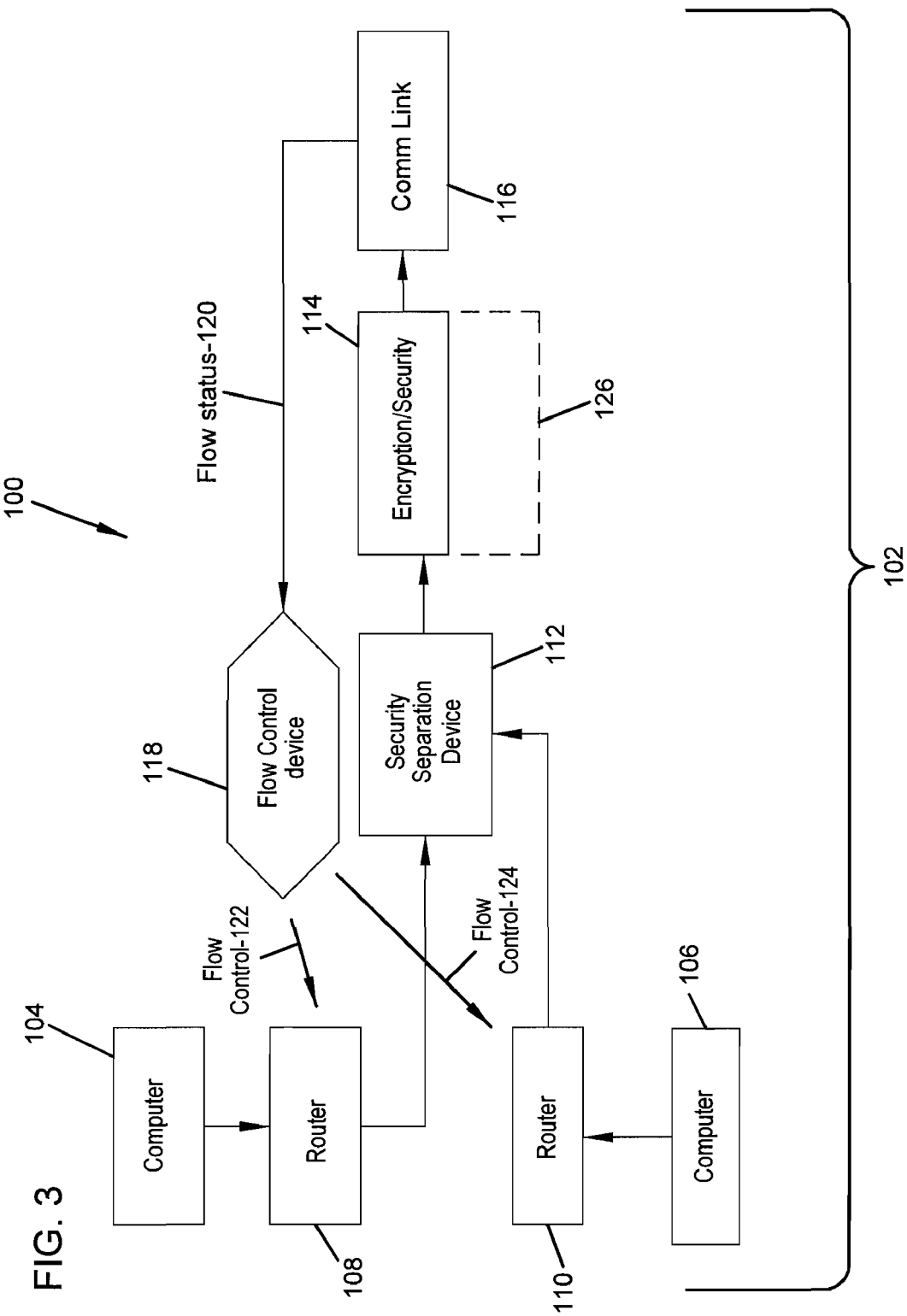

COMMUNICATIONS NETWORK WITH FLOW CONTROL

FIELD

This disclosure relates to communication networks, in particular to communication networks with network links that have speeds that are orders of magnitude different or where network delay is relatively large.

BACKGROUND

The use of data flow control in communication networks is known and many solutions, for example transmission control protocol and internet protocol (TCP/IP) and IEEE 802.3, have been identified for different layers in the network stack. These historic solutions work well when the network is homogenous (i.e. roughly the same network speed on all links), duplex (i.e. data is sent in both directions), and where the delay between sending and receiving is manageable. In addition, the historic solutions work well when all devices in an area of data congestion can identify and report overloads, and report the overload to its immediate neighbor in the network link.

In the case of satellite communications, a typical communication network cannot fully maximize IP traffic over a satellite because the network is unable to detect how fast data is transmitted. Therefore, data transfer is regulated based upon link estimates. The result is much less data is sent than is theoretically possible across an IP satellite link.

For military avionics systems using IP over satellite, there is no support for flow control between a router and the modem sending the data packets to the satellite from the aircraft. There is also typically an encryption device or other security device between the router and the modem which prevents flow control from the modem, if the modem even supports flow control, from reaching the router. The router will take data as fast as an application generates it, and route the data packets to the modem. However, the modem will drop the packet if the modem is overloaded thereby causing data loss.

A lost data packet is lost forever if it is part of real-time streamed video. In certain circumstances, that lost packet can contain critical data, such as a clear picture of the enemy or a friendly. It may be a very long time before the system can retransmit the video and guarantee it is intact and correct.

Improvements in communication systems to maximize data transmission and prevent loss of data are needed.

SUMMARY

Systems and methods are described for implementing flow control in communication networks to maximize data transmission of, and prevent loss of data by, the communication networks. The systems and methods described herein work especially well in non-homogenous networks (i.e. where network links have speeds that are orders of magnitude different), where the network is simplex (i.e. data is sent in a single direction) or effectively simplex because the back link is small, and where the network delay is relatively large. The systems and methods described herein also work especially well where a device in the network link cannot identify overloads, a device in the link has no protocol support to report data overloads, a device in the link cannot forward reported overload notifications, or where system security requirements and/or devices block general transfer of data.

The systems and methods described herein are designed to maximally load the network without losing data. It is far better to send data at the rate that the network can losslessly transmit so data is never lost. Nonetheless, if data is lost, it must not be safety critical (i.e. high priority) data. The systems and methods described herein allow use of mostly commercial off the shelf components in this environment by providing immediate flow control to mitigate the aspects of the satellite portion of the network.

Data flow status is designed to reach each network device where the decision to prioritize and buffer data is made. Where there are devices that do not provide flow control, flow control is provided on their behalf. For example, where a satellite modem does not provide flow control, a flow control device is provided in front of the modem. The flow control device knows the data transfer characteristics of the modem, for example by receiving data transfer status information from the modem or by modem characteristic information loaded into the flow control device, and creates flow control on its behalf.

Where one or more devices on the network are not routers and have no flow control, or are devices that provide security such as encryption or data security separation, a flow control device is put in front of the device(s). The flow control device reads buffer status information from the distant network device and sends appropriate flow control to the device, for example a router, in front of it in the link.

In one embodiment, a method of maximizing lossless data transfer in a communications network is provided. The method includes transferring data from a first device in the communications network to a second device in the communications network at a first maximum data transfer rate, and transferring data from the second device at a second maximum data transfer rate that is less than the first maximum data transfer rate. A flow control device that is interconnected between the first device and the second device is used to control the rate of data transfer of the first device to the second device.

In another embodiment, a communications network includes a first device that transfers data at a first maximum data transfer rate, and a second device connected to the first device to receive data transferred from the first device. The second device transfers data at a second maximum data transfer rate that is less than the first maximum data transfer rate. A flow control device is interconnected between the first device and the second device, with the flow control device controlling the rate of data transfer of the first device to the second device.

In yet another embodiment, an airborne communications network includes an aircraft having a computer, a router connected to the computer to receive data from the computer and that transfers data at a data transfer rate, and a communication system connected to the router to receive data transferred by the router. The communication system is configured to transfer data to a device separate from the aircraft at a data transfer rate. In addition, a flow control device is interconnected between the router and the communication system, with the flow control device controlling the rate of data transfer of the router.

DRAWINGS

FIG. 3 is a block diagram of a portion of another exemplary airborne network implementing flow control.

DETAILED DESCRIPTION

Figure 1A:
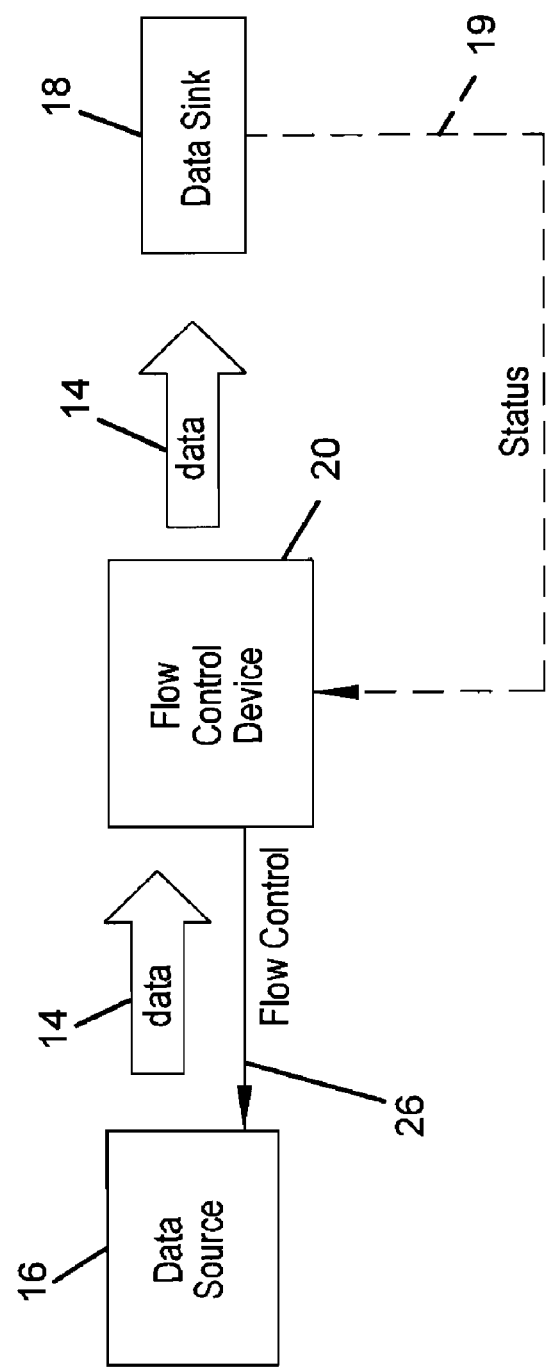
FIG. 1A is a diagram of the implementation of a flow control device in a communications network.

With reference initially to FIG. 1A, the concept of flow control as used in a communication network described herein is illustrated. A flow control device 20 is provided between a data source 16 and a data sink 18. Data packets 14 are sent from the data source 16 to the data sink 18 via the flow control device 20. The data source 16 can be any source of data, and can be where the data packets originate or the data packets can be simply passing through the data source from a link in front of the source 16. An example of a data source 16 is a router that is capable of queuing data packets for later delivery when the next device in the network is not ready to receive data. The data sink 18 is the next hop in the network and can be any device that can store data and transfer data.

In some embodiments, the data sink will have limited data storage and a data transfer rate that is orders of magnitude less than the data source 16. Because of the significantly slower transfer speed of the data sink 18 compared to the data source 16, the data sink can become overloaded which can cause data packets to be dropped. To avoid this, the flow control device 20 determines whether or not the data sink 18 is overloaded. If the data sink is a device that is configured to report buffer status, then a buffer status signal 19 can be provided from the data sink to the flow control device 20. If the data sink is not configured to report buffer status, then the flow control device is preferably provided with data transfer characteristic information of the data sink, whereby the flow control device estimates whether or not the data sink is overloaded and whether or not to apply flow control.

Figure 1B:
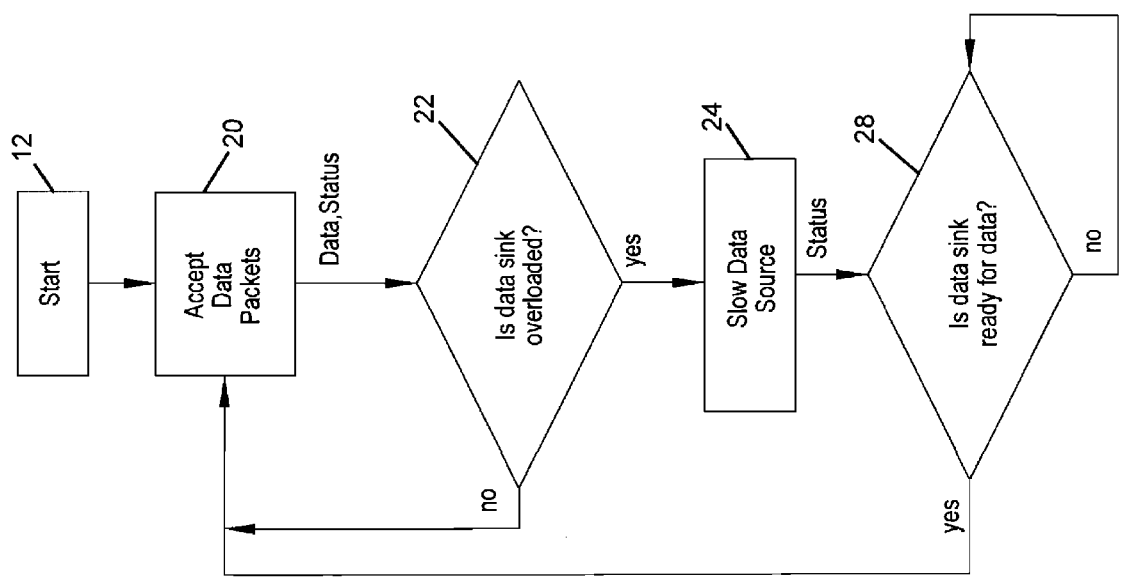
FIG. 1B illustrates processing within the flow control device of FIG. 1A.

The operation of the flow control device 20 will now be described with reference to FIG. 1B along with FIG. 1A. The process starts 12 and the flow control device 20 accepts data packets. While in the accept data packets state, the flow control device 20 accepts and forwards data packets. It also computes the loading on the data sink 18 using the status 19 received from the data sink, if available.

The process then proceeds to step 22 where the flow control device 20 determines whether or not the data sink is overloaded. If it is not overloaded, then more data packets are accepted and data packets will continue to be sent to the data sink 18. If it is overloaded, a decision 24 is made by the flow control device to slow the data source 16 to reduce the rate of data packet transfer to the data sink 18. For example, an appropriate control command(s) 26 is sent by the flow control device 20 to the data source 16 to pause, i.e. stop, or slow the sending of data packets. The flow control device 20 also computes the loading on the data sink 18 using the status 19 received from the data sink, if available. Instead of pausing data transfer, the control command sent by the flow control device might allow blocking of specific data streams versus all data streams. For instance, low priority data streams could be blocked while high priority data streams could continue.

The process then proceeds to step 28 where it is determined whether or not the data sink 18 is ready for more data packets. If it is not, the data source remains in its slowed state. If it is determined that the data sink is ready for more data packets, an appropriate control command is sent to the data source 16 by the flow control device 20 to resume the normal transfer of data packets.

Figure 2:
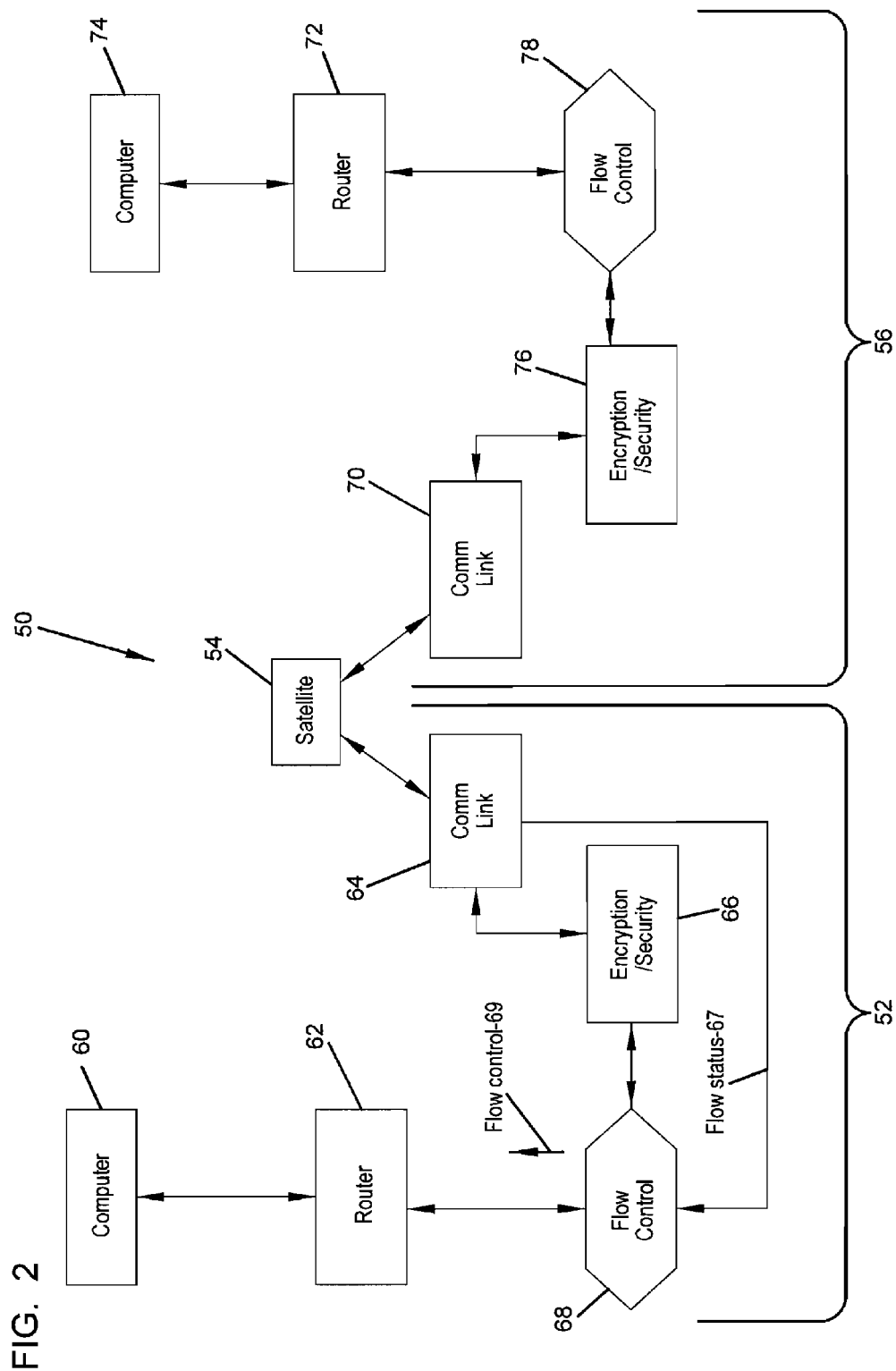
FIG. 2 is a block diagram of an exemplary airborne network implementing flow control.

With reference now to FIG. 2, an implementation of flow control in a communication network 50 is illustrated. The network 50 is illustrated as an airborne communications network including an aircraft 52, a satellite 54, and a ground link to a ground station 56. However, it is to be realized that the flow control concepts described herein can be applied to other communications networks.

The aircraft 52, which can be any type of aircraft including manned and unmanned, includes a computer 60 which generates data. The data can be sensory data from one or more sensors on the aircraft, flight control data, or any other type or combination of data. The data from the computer 60 is sent to a router 62 which transfers data to a communication link 64, for example a modem. The communication link 64 then transfers data to the satellite 54, and the satellite then relays data to the ground station 56 via a communication link 70. The data is then sent to a router 72 at the ground station and to a computer 74 for analysis, storage, and/or rerouting of the data.

On the aircraft 52 side of the network, an encryption/security device 66 can be provided between the router 62 and the communication link 64. The device 66 is intended to provide data encryption/decryption. Typically, the encryption/security device 66 does not support flow control and acts to block flow control if supported by the communication link 64. An example of a suitable encryption/security device 114 is a High Assurance Internet Protocol Encryptor (HAIPE). The device 66 could also be an IP to serial conversion device that manages IP protocol with the network and then converts it to a serial transmission protocol expected by many satellite modems.

The router 62 typically has a data transfer rate that is order of magnitudes higher than the data transfer rate of the communication link 64. For example, the data transfer rate of the router could be in the 100's of megabytes while the data transfer rate of the communication link 64 could be in the 1-10 megabyte range. The return link from the communication link 70 to the satellite 54 to the communication link 64 may have a transfer rate that is orders of magnitude slower than the data transfer rate, for example kilobytes. This very unbalanced data transfer rate makes higher protocol stack flow control, such as TCP/IP, untenable in this environment. It is untenable because there is not enough bandwidth to even send standard flow control messages even if the time delay from ground 56 to air 52 were not a problem.

Therefore, to maximize the amount of data transferred from the aircraft 52 to the satellite without loss of data, a flow control device 68 is provided between the router 62 and the communication link 64, in front of the encryption/security device 76, to control the flow of data to the communication link. The flow control device 68 functions as discussed above for FIGS. 1A and 1B. The flow control device 68 receives information 67 from the communication link 64 regarding the flow status of data from the link 64 to the satellite 54. This flow status information preferably bypasses the encryption/security device 66 to avoid being blocked by the device 66. Alternatively, if the communication link is unable to report flow status information, the flow control device 68 is provided with data transfer characteristic information of the communication link. The flow control device 68 then uses that information to estimate whether or not the communication link 64 is overloaded and whether or not to apply flow control.

If the flow control device 68 determines that the communication link is overloaded, then the flow control device applies flow control by sending a flow control command 69 to the router to modify the rate of data transfer from the router 62. Alternatively, the flow control command could be generated or stored in the router 62, with the flow control device 68 simply instructing the router to generate or locate a suitable flow control command. The flow control device can be designed to apply any type of flow control suitable for controlling data flow, including but not limited to, standard IEEE 802.3 flow control. The flow control command 69 can instruct the router to pause further data transfer.

There could also be additional routers or switches in the path between the flow control device 68 and the communication link 64. In addition, another device that could be in the path would be a radio device that is receiving local radio transmissions and performing voice over IP which will be sent over the satellite to the ground station. An example of this is ground station voice communication to a remote air traffic control station or remote landing site.

The ground station 56 is similar to the aircraft 52 in that the ground station includes an encryption/security device 76 between the router 72 and the communication link 70, and a flow control device 78 between the router and the encryption/ security device 76. The ground station 56 side of the network functions in a similar manner to that described for the aircraft 52 side of the network.

FIG. 3 illustrates a portion of another embodiment of an airborne communication network 100. FIG. 3 illustrates the aircraft 102 side of the network, which in a manner similar to the embodiment in FIG. 2, would include a satellite (not shown) and a ground station (not shown).

In FIG. 3, the aircraft side of the network includes a first computer 104 that generates life or safety critical data. A second computer 106 generates low priority data, for example video data from a camera mounted on the aircraft. The critical data is transferred to a router 108, for example a flight router, while the low priority data is transferred to a second router 110, for example a mission router.

The data from the routers 108, 110 is then transferred to a security separation device 112. The security separation device performs priority queuing to ensure that the critical data is queued and forwarded before the low priority data. An example of a security separation device is a trusted input/ output module described in U.S. patent application Ser. No. 12/109,867 filed on Apr. 25, 2008 and entitled Secure Communication System.

An encryption/security device 114 receives data transferred from the security separation device 112, and transfers the data to a communication link 116, for example a modem, for transmission to the satellite. The data transfer rate of the communication link 116 is orders of magnitude less than the data transfer rate of the routers 108, 110, and the satellite in communication with the communication link has a data transfer rate that is orders of magnitude less than the communication link. For example, the data transfer rate from the routers to the security separation device could be gigabit, the transfer rate from the security separation device to the encryption/ security device and to the communication link could be 100 megabit or 10 megabit, and the communication link could be on the order of 128 kilobits per second or less. As discussed above in the embodiment in FIG. 2, the return link used for high level flow control can be even less.

The encryption/security device 114, which can be a HAIPE or other suitable device, and the security separation device 112, block flow control if supported by the communication link 116. Therefore, flow control must be provided at a location so as to be able to apply flow control to the routers 108, 110.

As illustrated in FIG. 3, a flow control device 118 is placed in front of or incorporated into the security separation device 112. The flow control device 118 receives information 120 from the communication link 116 regarding the flow status of data from the link 116 to the satellite. This flow status information preferably bypasses the encryption/security device 114 and the security separation device 112 to avoid being blocked. Alternatively, if the communication link is unable to report flow status information, the flow control device 118 is provided with data transfer characteristic information of the communication link 116. The flow control device 118 then uses that information to estimate whether or not the communication link 116 is overloaded and whether or not to apply flow control.

In an alternative embodiment, a flow control device 126 (illustrated in dashed lines in FIG. 3) can be incorporated in front of or as part of the encryption/security device 114. In this embodiment, the security separation device 112 would be required to be able to receive the flow control commands and forward them to the routers 108, 110.

If the flow control device 118 determines that the communication link is overloaded, then the flow control device applies flow control by sending flow control commands 122, 124 to the routers 108, 110 to modify the rates of data transfer from the routers. The flow control device 118 can be designed to apply any type of flow control suitable for controlling data flow, including but not limited to, standard IEEE 802.3 flow control. The flow control commands 122, 124 can instruct the routers to pause further data transfer or simply slow one or more of their respective data transfer rates. Because the security separation device performs priority queuing to ensure that the critical data is queued and forwarded before the low priority data, the flow control commands 122, 124 sent to the routers 108, 110 will be consistent with that function to ensure that the flow of critical data from the router 108 takes priority over the flow of low priority data from the router 110.

In the embodiment of FIG. 3, if the critical data that is transferred by the communication link occupies the entire transmission capacity of the communication link, then the flow control device will prevent transfer of low priority data from the router 110. If there is sufficient capacity left over in the transmission to accommodate some or all of the low priority data, then the flow control device will permit a sufficient amount of the low priority data to be transferred from the router 110 to maximize the amount of data that is transmitted.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of maximizing lossless data transfer in a communications network, comprising:

transferring data from a first device in the communications network to a second device in the communications network, the first device capable of transmitting data only at or below a first maximum data transfer rate;

transferring data from the second device that is capable of transmitting data only at or below a second maximum data transfer rate, the second maximum data transfer rate being less than the first maximum data transfer rate;

using a flow control device interconnected between the first device and the second device to control a rate of data transfer from the first device to the second device; and using the flow control device to estimate an appropriate flow control to apply, and sending a flow control command from the flow control device to the first device based on the estimate;

wherein the flow control command controls the rate of data transfer from the first device to the second device.

2. The method of claim 1, comprising sending information from the second device to the flow control device regarding the status of data transfer from the second device.

3. The method of claim 2, wherein there is a security device between the flow control device and the second device, and including sending the information from the second device to the flow control device so that the information bypasses the security device.

4. A communications network, comprising:
a first device that is capable of transferring data only at or below a first maximum data transfer rate;
a second device connected to the first device to receive data transferred from the first device, the second device is capable of transferring data only at or below a second maximum data transfer rate that is less than the first maximum data transfer rate; and
a flow control device interconnected between the first device and the second device, the flow control device controlling a rate of data transfer of the first device to the second device, the flow control device configured to estimate an appropriate flow control to apply and configured to send a flow control command from the flow control device to the first device based on the estimate, wherein the control commands control the rate of data transfer of the first device to the second device.

5. The communications network of claim 4, wherein the first device includes a first router and the second device comprises a modem.

6. The communications network of claim 4, further comprising a security device between the flow control device and the second device.

7. The communications network of claim 6, wherein the security device includes an encryption device or a security separation device.

8. The communications network of claim 5, comprising a second router in front of the flow control device, wherein the first router routes priority data and the second router routes low priority data; and further including a security separation device connected to the first and second routers and receiving the priority data and the low priority data.

9. The communications network of claim 6, wherein the flow control device is incorporated into the security device.

10. The method of claim 1, wherein the second maximum data transfer rate is orders of magnitude slower than the first maximum data transfer rate.

11. The method of claim 1, sending data transfer characteristic information from the first device to the flow control device.

12. The communications network of claim 4, wherein the second maximum data transfer rate is orders of magnitude slower than the first maximum data transfer rate.

13. The communications network of claim 4, wherein the flow control device estimates the appropriate flow control to apply based on flow status information sent from the second device.

14. The communications network of claim 4, wherein the flow control device estimates the appropriate flow control to apply based on data transfer characteristic information sent from the first device.

15. The communications network of claim 6, wherein the second device is configured to send flow status information to the flow control device by bypassing the security device.

16. The communications network of claim 4, wherein the communications network is not configured to use a high protocol stack flow control including a Transfer Control Protocol/Internet Protocol (TCP/IP).

17. The method of claim 1, wherein the flow control device estimates the appropriate flow control to apply based on data transfer characteristic information from the first device.

* * * * *